United States Patent
Kemmler

(10) Patent No.: US 9,128,962 B2
(45) Date of Patent: Sep. 8, 2015

(54) VIEW BASED TABLE REPLACEMENT FOR APPLICATIONS

(71) Applicant: Andreas Kemmler, Boennigheim (DE)

(72) Inventor: Andreas Kemmler, Boennigheim (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 13/794,252

(22) Filed: Mar. 11, 2013

(65) Prior Publication Data

US 2014/0258217 A1   Sep. 11, 2014

(51) Int. Cl.
*G06F 17/30* (2006.01)

(52) U.S. Cl.
CPC .... *G06F 17/30289* (2013.01); *G06F 17/30383* (2013.01)

(58) Field of Classification Search
CPC .............. G06F 17/30489; G06F 17/30383
USPC ................... 707/609, 796; 715/762
See application file for complete search history.

(56) References Cited

U.S. PATENT DOCUMENTS

| | | | |
|---|---|---|---|
| 7,058,640 B2 | 6/2006 | Le | |
| 7,620,617 B2 | 11/2009 | Craig et al. | |
| 7,685,109 B1 | 3/2010 | Ransil et al. | |
| 7,933,869 B2 | 4/2011 | Becker et al. | |
| 8,069,184 B2 | 11/2011 | Becker et al. | |
| 8,224,828 B2 | 7/2012 | Figus | |
| 8,255,791 B2 | 8/2012 | Koren | |
| 8,346,722 B2 | 1/2013 | Mordvinova et al. | |
| 8,706,772 B2 | 4/2014 | Hartig et al. | |
| 2003/0046292 A1* | 3/2003 | Subramanian et al. | 707/100 |
| 2006/0195460 A1 | 8/2006 | Nori et al. | |
| 2012/0110021 A1* | 5/2012 | Hryniewicki | 707/790 |
| 2013/0325867 A1 | 12/2013 | Kemmler et al. | |
| 2013/0332862 A1 | 12/2013 | Mirra et al. | |
| 2013/0339881 A1 | 12/2013 | Kemmler et al. | |
| 2014/0067868 A1 | 3/2014 | Kemmler et al. | |

OTHER PUBLICATIONS

Marc Bernard; "SAP High-Performance Analytic Appliance 1.0 (SAP HANA)" SAP Technology Regional Implementation Group, Feb. 2011, 43 pages.*

* cited by examiner

*Primary Examiner* — Monica Pyo
(74) *Attorney, Agent, or Firm* — Schwegman Lundberg & Woessner, P.A.

(57) ABSTRACT

A method includes identifying a table over a conventional database used by an application, creating a view of the table equivalent to the identified table in an in-memory database, and calling the view with a same call as used for the identified table such that calling the view via the application provides a same result as would have been obtained from the same call to the table in the conventional database.

16 Claims, 4 Drawing Sheets

VIEW BASED TABLE REPLACEMENT FOR APPLICATIONS

BACKGROUND

Many applications run on application servers which are coupled to a relational database to store application data. To enhance the performance of the applications, data in the database may be stored in multiple different forms. In addition to a traditional relational table of data, various subsets of the data with aggregations may be stored in various tables and indices to facilitate quick access to the data to run certain analytical reports. Over time, the number of additional tables used to enhance the speed at which reports are run may become quite large. If the application data is frequently modified, there can be significant overhead involved in maintaining and updating all the tables. In addition, more tables may be created by customers to handle newly desired reports that may require complex aggregations of and analytics on the data.

SUMMARY

A method includes identifying a table over a conventional database used by an application, creating a view of the table equivalent to the identified table in an in-memory database, and calling the view with a same call as used for the identified table such that calling the view via the application provides a same result as would have been obtained from the same call to the table in the conventional database.

A computer readable storage device has instructions to cause a computer to execute a method, the method including identifying a table over a conventional database used by an application, creating a view of the table equivalent to the identified table in an in-memory database, and calling the view with a same call as used for the identified table such that calling the view via the application provides a same result as would have been obtained from the same call to the table in the conventional database.

A database system includes a random access memory to store rows and columns of data associated with an application. An input is adapted to receive calls from the application directed toward tables of a conventional database. Views provide output equivalent to corresponding tables. A database engine is coupled to the random access memory and coupled to receive the calls and execute the views to provide the equivalent output to the application.

DETAILED DESCRIPTION

Figure 1:
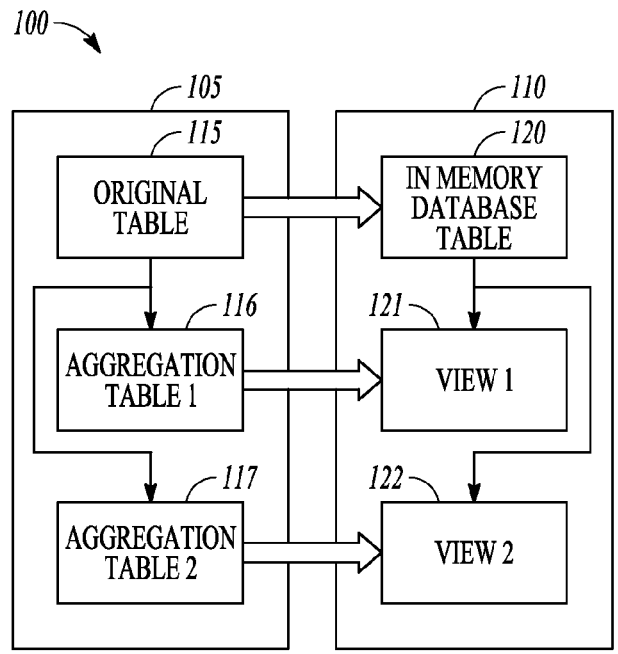
FIG. 1 is a block diagram of a conversion process to convert tables into views according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In a business suite of applications, there are several scenarios where data are stored redundantly in a database to improve the performance in analytical scenarios. The most prominent cases are aggregation tables and index tables. Applications may store a certain set of data redundantly and aggregated (according to certain application specific criteria) in a separate table in the database referred to as an aggregation table. Applications may also store a certain set of data (sometime even from different database tables) in one or more separate tables. This is often a 'relic from the past' because it is not possible to create database indices for certain 'legacy' types of tables (cluster table and pooled tables). Instead of working with database indices, the applications were forced to do the 'indexing' on their own by introducing the index tables. Both aggregation and index tables have the typical disadvantages which come with storing data redundantly in different tables:

The tables have to be kept in sync, which increases the complexity of the application coding and which makes the solution prone to errors. Through keeping the table in sync, the performance when writing data is reduced. This is especially the case for aggregation tables as database locks may occur due to the aggregation (several records of the original table impact the same aggregation record) which prevents a good parallelization of write accesses. To further complicate matters, customers may have extended the aggregation or index table with customer specific fields.

In various embodiments, the application data is stored in an in memory column store database, and views are created to replace the tables. The views may be called by the application using the same calls as were used for the replaced tables. By naming the views exactly the same as the tables they replaced, customer coding does not need to change in order to call the views instead of the tables. Since aggregations and other analytics may be performed very efficiently in the in memory database, complex aggregations and analytics may be obtained without the need to store and maintain additional tables.

FIG. 1 is a block diagram illustrating a conversion process 100 to convert optimization tables in a conventional database 105 into views in an in memory database 110. The conventional database 105 may contain an original table 115 containing data for an application, and one or more additional tables derived from the original table 115, such as aggregation tables indicated at 116, 117 to improve the efficiency of retrieving data for reports that call for aggregations.

The original table is replicated in the in memory database 110 at a table 120. Each aggregation table 116, 117 is converted into a view as indicated at 121 and 121 respectively. The views in one embodiment are identifiable using the same syntax as a call to one of the aggregation tables. In other words, when an application calls for a report that previously utilized one or more of the aggregation tables in the convention database, those calls are used to invoke the corresponding views 121 and 122. The in memory database 110 then executes those views against the table 120.

An example original table 115, which is much smaller than typical application tables for ease of illustration, is shown in the following Table A:
ORIG_TABLE (containing the original data):

TABLE A

| KEY1 | KEY2 | DATA1 | DATA2 | DATA3 | DATA4 | DATA5 |
|------|------|-------|-------|-------|-------|-------|
| 1 | 1 | 300 | 300 | 400 | 500 | 600 |
| 1 | 2 | 100 | 100 | 500 | 600 | 400 |
| 2 | 3 | 200 | 200 | 500 | 500 | 500 |

Table 116 is an aggregation of column DATA1 according to KEY1:
TOTALS1 (aggregation of column DATA1 according to KEY1:

TABLE B

| KEY1 | DATA1 |
|------|-------|
| 1 | 400 |
| 2 | 200 |

The number "400" in the first row in Table B containing numbers is obtained by adding 300+100 taken from the two rows where KEY1=1, and in column DATA1 in Table A.

Table 117 is an aggregation of column DATA2, DATA3 according to KEY1:
TOTALS2 (aggregation of column DATA2, DATA3 according to KEY1:

TABLE C

| KEY1 | DATA2 | DATA3 |
|------|-------|-------|
| 1 | 400 | 900 |
| 2 | 200 | 500 |

The aggregation tables 116, 117 may be accessed by application codding. Examples of application coding accessing the aggregation tables includes:
SELECT*FROM TOTALS1 WHERE KEY1=1
SELECT DATA2 FROM TOTALS2 WHERE KEY1>1

As described above, database views 121 and 122 in in memory database 110 may be used to replace tables TOTALS1 116 and TOTALS2 117. The views may be created from the replicated original table in in memory database table 120 as follows:

For view 121:

```
CREATE VIEW "TOTALS1" ( "KEY1",
    "DATA2" ) AS select
    "KEY1",
    sum("DATA2")
    from "ORIG_TABLE"
    group by "KEY1"
```

For view 122:

```
CREATE VIEW "TOTALS2" ( "KEY1",
    "DATA2", "DATA3" ) AS select
    "KEY1",
    sum("DATA2"),
        sum("DATA3")
    from "ORIG_TABLE"
    group by "KEY1"
```

The combination of the SQL statements sum(xyz) and group by ("KEY1") calculates the sum of xyz according to column KEY1.

In one embodiment, the application may call these views using the same application coding as identified above for accessing the tables.

Figure 2:
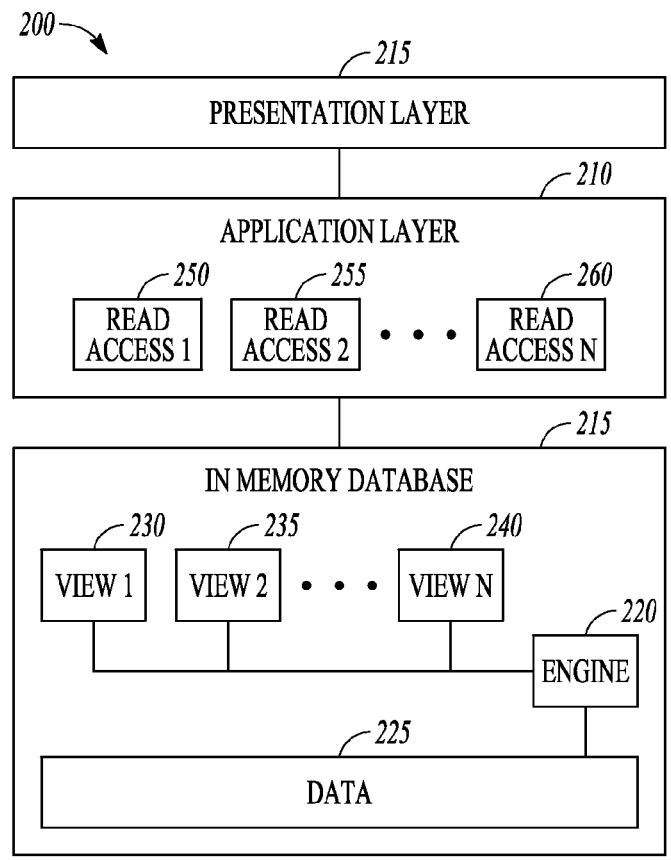
FIG. 2 is a block diagram of a system to execute replacement database views according to an example embodiment.

A logical block diagram of a system 200 is illustrated in FIG. 2. In system 200, an application is running in an application layer 210, and provides a user interface, such as interactive screens of information generated by the application at a presentation layer 215. The application is coupled to an in memory column store database 220 in a database layer, which has replaced a conventional database that may have had multiple aggregation tables and indices. The database 220 contains data 225 in a random access memory. The data 220 is a replication of data, usually rows and columns of a main table, from the conventional database. In addition, multiple views are indicated at 230, 235, and 240 that are generated based on the previous aggregation tables and optional index tables contained in a conventional database prior to the substitution of the conventional database for the in memory database 220. An engine 245 executes the views over the data 225 and performs other functions common to an in memory database.

The application layer 210 may call the views in the same manner as the previous tables were called in the conventional database as indicated at read access blocks 250, 255, and 260. These blocks are representative of application code that may be written in a database language that provides a high level abstraction of the data in the database. Various examples include the advanced business application programming (ABAP) language. ABAP generated code is comparable to Java bytecode. In some embodiments, the code may be included in a business function that is a self-contained function that can be switched on. Multiple business functions may be switched on to form a business function set that represents a tailorable industry solution.

SAP HANA database is an example of the in memory database 220 that may be used in some embodiments. In system 200, the in memory database 220 is being utilized as a primary database for the application 210. In one embodiment, an application runs directly on the in memory database 220. A database table for the application is part of the in memory database 220, and the view which replaces the database table from a conventional database is also part of the in memory database. Depending on an application business function, either the database table or a view is accessed.

The in memory database 220 may be used to perform aggregations on the fly with the same performance as a conventional database having multiple tables. In addition, the in memory database 220 offers automatic indices for each column in a table for a column oriented architecture, which makes separate index tables obsolete.

Figure 3:
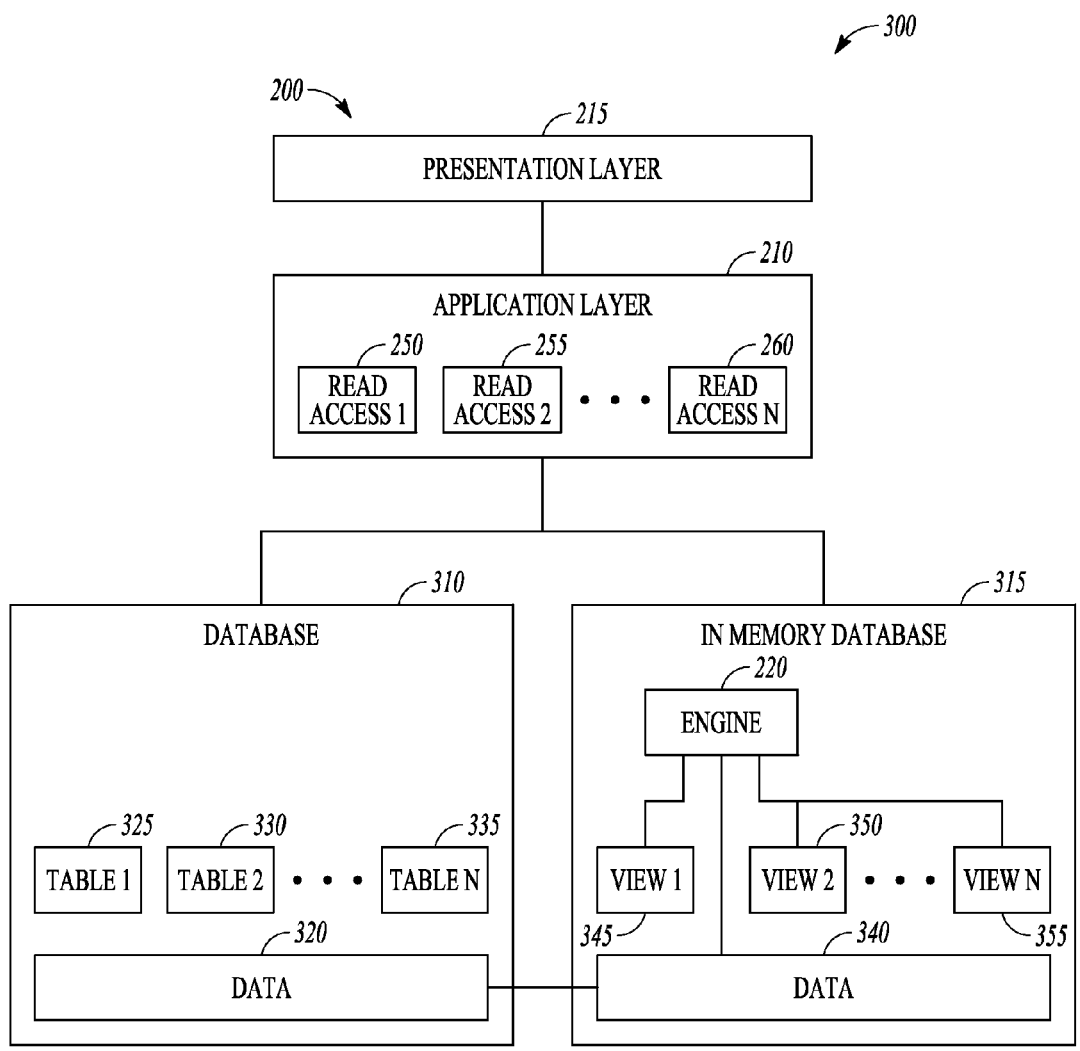
FIG. 3 is a block diagram of a system having a conventional and an in memory column store database according to an example embodiment.

FIG. 3 illustrates an alternative system 300 wherein instead of replacing a conventional database shown at 310 with an in memory column store database indicated at 315, the two databases run side by side. Conventional database 310 contains original data 320 as well as multiple tables 325, 330, 335 for optimization of requested reports. While tables are referred to in this description, many other forms of duplicated data used to increase performance are meant to be included in the term "tables." In memory database 315 includes a replicated version 340 and a plurality of views 345, 350, 355 corresponding to the tables 325, 330, 335 of the original data in database 310. In one embodiment, once the views are established, the tables 325, 330, 335 may no longer need to be kept or updated, as calls to such tables will be redirected to the views in in memory database 315.

There are various situations which may need to be considered when deciding whether to replace a conventional database as shown in FIG. 2, or whether to run the in memory database in parallel with the conventional database as shown in FIG. 3. Some example considerations include whether a customer has extended aggregation tables with customer specific fields. A customer may not have migrated all their applications to an in memory column store type of database. This type of situation may be referred to as a mixed system landscape. Customers might have their own programs accessing the Aggregation or Index Tables. Such accesses are likely read accesses in analytic scenarios but it might also occur that customers changed (modified/extended) the way how data is written to the Aggregation or Index Tables. The use of views does not force customers to change their reading accesses to the aggregation or index tables.

The situation is different for customer write accesses as this is done only rarely. It may be acceptable that customers will change their source code which accesses the aggregation or index tables in a data manipulating manner, such as write operations. Such changes may take some time. In various embodiments, the customer may not adapt their coding as part of a migration project. A certain level of flexibility allows customers to do the coding adaption any time after the migration to an in memory database such as a HANA DB.

In some customer situations, the aggregation and index tables may contain additional data which are not stored in the original table but which are calculated or retrieved from other tables. Various embodiments also cover such data which surely makes the solution more complex as not all data might be retrieved from the original data table.

A common theme regardless of which embodiment is used includes replacing a transparent table (the aggregation table or index table) with a database view. This should be done in a way that all read accesses to the transparent table are automatically redirected to the in memory database view. The database view is to be implemented by application development in a way that it returns the same data as the access to the transparent table did before.

In one embodiment, ABAP DDIC (data dictionary) offers the ability to replace a table with a database view. Such a database view may be referred to as a replacing database view. Accesses in ABAP coding may automatically be redirected to the replacing database views. This redirection will be reached by giving the replacing database view the same name as the transparent table in ABAP DDIC in one embodiment.

The redirection will automatically cover all read accesses to the aggregation and index tables in customer systems. The replacing database view might be a rather complex view as it might need to select data form different database tables and might need to offer calculated fields etc. As ABAP DDIC views offer only a limited feature set, database specific views may also be supported. In both case the 'replacing' should happen non-disruptively. In various embodiments, read accesses should not be modified in application or customers coding. Database specific views can be 'integrated' in ABAP DDIC via external views. It is therefore possible to use an external view to redirect accesses to the aggregation or index table to a database specific view (if the external view has the same name as the aggregation or index table).

In a further embodiment, DB specific views are supported. The replacing database views are either an ABAP DDIC view or a DB specific view which is integrated to ABAP DDIC via the external view concept (or something equivalent). ABAP source code accessing the Aggregation or Index Table can stay unchanged in both cases.

In a further embodiments, views are extensible. Customers may be able to exchange the replacing database view delivered by a developer with an own view. The view delivered from the developer may be seen as 'default implementation' covering the standard solution without customer extensions. When customers enter their own view, the view is seen as an 'extension' which stays stable/unchanged even after new transports are imported from SAP.

Replacing a developer provided view has its limitations in the following situation: The developer might add additional fields to aggregation or index tables in future shipments and access these fields in ABAP source code. Customers who exchanged the replacing database view delivered by the developer with an own view may run into problems. The new fields are not covered in their view and the developer sources which access the new fields may be either syntactically no longer correct or might work on wrong assumptions.

A corresponding version concept is utilized to address the new fields. The assignment of a replacing database view to aggregation or index table shall get a version number. As soon as an aggregation or index table is extended, a new replacing database view will be added with a new (higher) version number. After the first extension of an aggregation or index table the application coding which accesses these tables checks the version of the assigned replacing database view in a customer system. All possible versions may be supported by the application coding.

In a further embodiment, a versioning method is used for replacing database views. The assignment of a replacing database view to an aggregation or index table is given a version number. A function is provided for application development to retrieve the number of the assigned replacing database view. The application will use this number to know which fields are supported by the assigned replacing database view in a customer system.

To ensure that the customer views are fitting to the aggregation or index tables in a customer system certain checks may be offered. In one embodiment, an ABAP DDIC consistency check is provided. ABAP DDIC will check whether the output structure of the replacing database view is identical or a projection of to the structure of the replaced table. Activation of customer views may be allowed when checks are passed successfully.

When customer are doing own write accesses to the aggregation or index tables the customer may adapt their coding before using the replacing database views, as write accesses may not be supported. There might be also customers who do not want to use replacing database views. And customers might have a mixed system landscape system as shown in FIG. 3, where some systems are on HANA (or other similar databases) and others are still on conventional databases. Such customers should explicitly decide whether they want to use replacing database views and in which systems they want to do so. In one embodiment, a switch per scenario/table is provided via a Business Function to activate use of the replacing database views. Such switching techniques may be used to introduce new functionality in a non-disruptive way. And there are also other DDIC elements which can be switched with a Business Function: DDIC Structure and Tables APPENDs, . . . etc.

In one embodiment, customers may be able to 'activate' the replacing of a transparent table through a database view explicitly with a Business Function. Business Functions may be delivered to customers in status 'off'. In a system where the Business Function is not activated just the 'old solution' continues to run, where reports are run via the conventional database tables.

Such a Business Function can also be offered in a reversible way, so that customers are able to switch back to the conventional database solution utilizing the tables. In such a case the Business Function may implement functionality which re-fills the aggregation and index tables. This is application specific but the Business Function infrastructure (of the Switch Framework) offers already the needed 'exits'.

Figure 4:
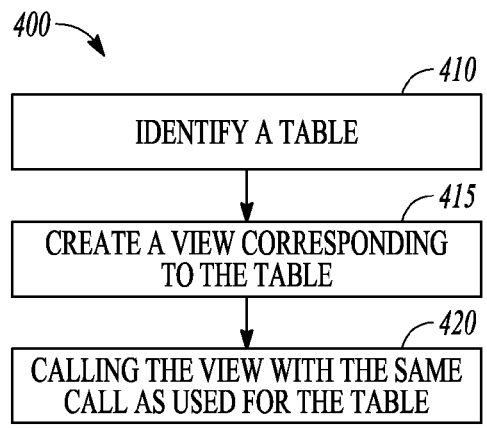
FIG. 4 is a flowchart illustrating a method of creating views corresponding to tables according to an example embodiment.

FIG. 4 is a flowchart illustrating a method 400 of creating views corresponding to tables. At 410, a table over a conventional database used by an application is identified. At 415, a view of the table equivalent to the identified table in an in-memory database is created. At 420, the view may be called with a same call as used for the identified table such that calling the view via the application provides a same result as would have been obtained from the same call to the table in the conventional database.

In some embodiments, the call may be provided via a business function that is switchable between calling the table in the conventional database and calling the view in the in memory database. The view may be called with the same name as the identified table.

Figure 5:
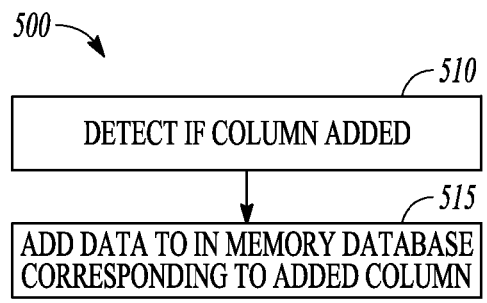
FIG. 5 is a flowchart illustrating a method to detect if additional data is contained in a table according to an example embodiment.

FIG. 5 is a flowchart illustrating a method 500 that detects at 510 if additional data is contained in the identified table as compared to the in-memory database. If such data has been added, the additional data is added to the in-memory database at 515 such that it is available via the view to provide the same result. In some embodiments, the additional data may be a new field.

Figure 6:
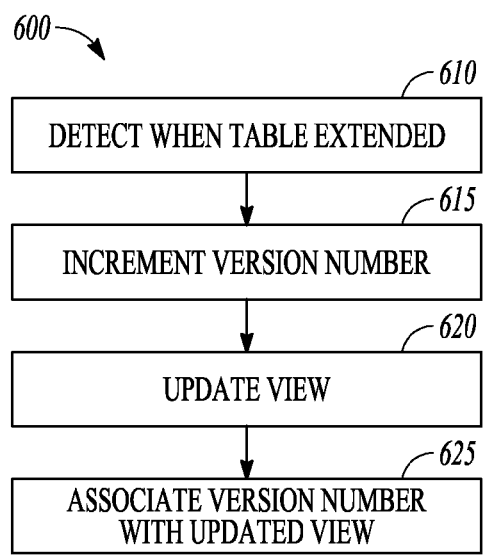
FIG. 6 is a flowchart illustrating a method utilizing version numbers for views according to an example embodiment.

FIG. 6 is a further flowchart illustrating a method 600 utilizing version numbers for views. At 610, it is detected when a table is extended. At 615 a version number is incremented responsive to the detection of the table being extended. The view may be updated at 620 view responsive to the extended table. At 625, the incremented version number is associated with the updated view.

In further embodiments, the identified table includes multiple aggregation tables and index tables, and a view is created for each table. Each created view may be given the same name as its corresponding table. In further embodiments, a version number may be assigned to the created view. In still further embodiments, the method may include performing a consistency check to determine whether an output structure of the created view is identical to the identified table.

Figure 7:
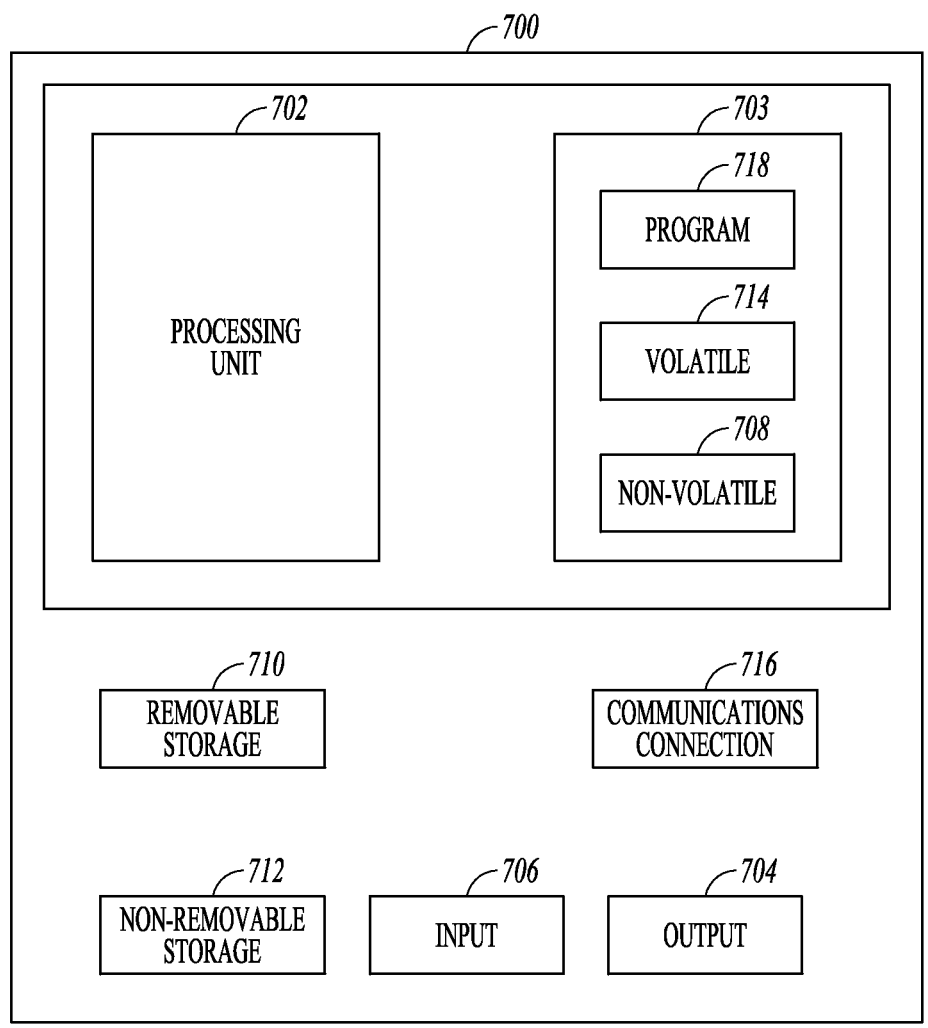
FIG. 7 is a block diagram of a computing device, according to an example embodiment.

FIG. 7 is a block diagram of a computing device, according to an example embodiment. In one embodiment, multiple such computer systems are utilized in a distributed network to implement multiple components in a transaction based environment, including application servers, databases, user devices and to implement one or more methods or algorithms. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a non-transitory computer-readable medium. For example, a computer program 725 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 710 to provide generic access controls in a COM based computer network system having multiple users and servers.

EXAMPLES

Example 1

A method comprising:
receiving a call from an application for a name of a table having aggregated data of a conventional database;
directing the call to a view in an in memory column store database, the view adapted to provide an output equivalent to an output of the table;
executing the view in the in memory column store database to provide the equivalent output; and
returning the equivalent output to the application.

Example 2

The method of example 1 wherein the call is received from a business function.

Example 3

The method of example 2 wherein the business function is switchable between calling a conventional database and calling the in memory column store database.

Example 4

The method of any of examples 1-3 wherein the view is called with the same name as the identified table.

Example 5

The method of any of examples 1-4 wherein the table comprises an aggregation table.

Example 6

The method of any of examples 1-5 wherein the table comprises an index table.

Example 7

The method of any of examples 1-6 and further comprising adding the additional data to the in-memory database such that it is available via the view to provide the same result.

Example 8

The method of example 7 wherein the additional data comprises a new field, and wherein the method further comprises:
 detecting when a table is extended;
 incrementing a version number;
 updating the view responsive to the extended table; and
 associating the incremented version number with the updated view.

Example 9

The method of any of examples 1-8 wherein the application includes multiple aggregation tables and index tables, and wherein a view is created for each table, and each created view is given the same name as its corresponding table.

Example 10

The method of any of examples 1-9 and further comprising assigning a version number to the created view.

Example 11

The method of any of examples 1-10 and further comprising performing a consistency check to determine whether an output structure of the created view is identical to the identified table.

Example 12

A computer readable storage device having instructions stored thereon to cause a computer to execute a method, the method comprising:
 receiving a call from an application for a name of a table having aggregated data of a conventional database;
 directing the call to a view in an in memory column store database, the view adapted to provide an output equivalent to an output of the table;
 executing the view in the in memory column store database to provide the equivalent output; and
 returning the equivalent output to the application.

Example 13

The computer readable storage device of example 12 and further comprising providing the call via a business function that is switchable between calling the conventional database and calling the in memory column store database.

Example 14

The computer readable storage device of any of examples 12-13 wherein the method further comprises adding the additional data to the in-memory database such that it is available via the view to provide the same result.

Example 15

The computer readable storage device of example 14 wherein the additional data comprises a new field, and wherein the method further comprises:
 detecting when a table is extended;
 incrementing a version number;
 updating the view responsive to the extended table; and
 associating the incremented version number with the updated view.

Example 16

The method of any of examples 12-15 wherein the application includes multiple aggregation tables and index tables, wherein a view is created for each table, wherein each created view is given the same name as its corresponding table, and wherein a version number is assigned to the created view.

Example 17

The computer readable storage device of any of examples 12-16 wherein the method further comprises performing a consistency check to determine whether an output structure of the created view is identical to the identified table.

Example 18

A database system comprising:
 an in memory column store database to store rows and columns of data associated with an application;
 an input to receive calls from the application directed toward tables of a conventional database;
 views that provide output equivalent to output from calls to the corresponding tables; and
 a database engine coupled to the random access memory and coupled to receive the calls and execute the views to provide the equivalent output to the application.

Example 19

The system of example 18 and further comprising a conventional database coupled to provide the rows and columns of data associated with the application.

Example 20

The system of example 19 and further comprising an application having business functions to select whether to call the conventional database or the database having the views to obtain the output.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving a call from an application, wherein the call identifies a name of a table in a conventional database having aggregated data of the conventional database;
directing the call to a view in an in memory column store database based on the name of the table, the view adapted to provide an output equivalent to an output of the table using aggregations of columns in the in memory column store database;
executing the view in the in memory column store database to provide the equivalent output;
returning the equivalent output to the application;
adding additional data to the in-memory database such that it is available via the view to provide the same result, wherein the additional data comprises a new field;
detecting when a table is extended;
incrementing a version number;
updating the view responsive to the extended table; and
associating the incremented version number with the updated view.

2. The method of claim 1 wherein the call is received from a business function and wherein the in memory column store database provides an automatic index for each column.

3. The method of claim 2 wherein the business function is switchable between calling a conventional database and calling the in memory column store database.

4. The method of claim 1 wherein the view is called with the same name as the identified table.

5. The method of claim 1 wherein the table comprises an aggregation table.

6. The method of claim 1 wherein the table comprises an index table.

7. The method of claim 1 wherein the application includes multiple aggregation tables and index tables, and wherein a view is created for each table, and each created view is given the same name as its corresponding table.

8. The method of claim 1 and further comprising assigning a version number to the created view.

9. The method of claim 1 and further comprising performing a consistency check to determine whether an output structure of the created view is identical to the identified table.

10. A computer readable storage device having instructions stored thereon to cause a computer to execute a method, the method comprising:
receiving a call from an application, wherein the call identifies a name of a table in a conventional database having aggregated data of the conventional database;
directing the call to a view in an in memory column store database based on the name of the table, the view adapted to provide an output equivalent to an output of the table using aggregations of columns in the in memory column store database;
executing the view in the in memory column store database to provide the equivalent output;
returning the equivalent output to the application;
adding additional data to the in-memory database such that it is available via the view to provide the same result, wherein the additional data comprises a new field;
detecting when a table is extended;
incrementing a version number;
updating the view responsive to the extended table; and
associating the incremented version number with the updated view.

11. The computer readable storage device of claim 10 and further comprising providing the call via a business function that is switchable between calling the conventional database and calling the in memory column store database.

12. The method of claim 10 wherein the application includes multiple aggregation tables and index tables, wherein a view is created for each table, wherein each created view is given the same name as its corresponding table, and wherein a version number is assigned to the created view.

13. The computer readable storage device of claim 10 wherein the method further comprises performing a consistency check to determine whether an output structure of the created view is identical to the identified table.

14. A database system comprising:
an in memory column store database to store rows and columns of data associated with an application;
an input to receive calls from the application directed toward tables of a conventional database, wherein each call identifies a name for a table in the conventional database;
views executable against the in memory column store database as associated with the names of the tables of the conventional database that provide output equivalent to output from calls to the corresponding tables;
a database engine coupled to receive the calls and execute the views against the in memory column store database using aggregations of columns to provide the equivalent output to the application;
add additional data to the in-memory database such that it is available via the view to provide the same result, wherein the additional data comprises a new field;
detect when a table is extended;
increment a version number;
update the view responsive to the extended table; and
associate the incremented version number with the updated view.

15. The system of claim 14 and further comprising a conventional database coupled to provide the rows and columns of data associated with the application.

16. The system of claim 14 and further comprising an application having business functions to select whether to call the conventional database or the database having the views to obtain the output.

* * * * *